United States Patent [19]

Hedengerg

[11] 4,198,197
[45] Apr. 15, 1980

[54] DEVICE FOR PELLETIZING AND DOSED FEEDING-OUT OF FODDER WITH VARYING DEGREE OF MOISTURE

[75] Inventor: Gunnar Hedengerg, Trollhättan, Sweden

[73] Assignee: AB Fyrtornet, Stockholm, Sweden

[21] Appl. No.: 904,289

[22] Filed: May 9, 1978

[30] Foreign Application Priority Data

May 13, 1977 [SE] Sweden ............................ 7705593
Sep. 26, 1977 [SE] Sweden ............................ 7710718

[51] Int. Cl.² .......................... B29F 3/00; A01F 29/00
[52] U.S. Cl. .......................... 425/305.1; 100/DIG. 3; 100/DIG. 6; 100/DIG. 9; 425/308; 425/314; 425/376 R; 425/382 R; 425/464
[58] Field of Search .................. 425/308–311, 425/382 R, 464, 305.1, 314; 264/142, 376 R, 376 B, 380; 100/DIG. 3, DIG. 6, DIG. 9, 94, 145

[56] References Cited

U.S. PATENT DOCUMENTS

| | | | |
|---|---|---|---|
| 1,946,740 | 2/1934 | Hall | 100/DIG. 3 |
| 2,005,689 | 6/1935 | Hall | 100/DIG. 3 |
| 2,144,055 | 1/1939 | Hall | 100/DIG. 3 |
| 2,401,236 | 5/1946 | Fielitz | 100/DIG. 3 |
| 2,432,734 | 12/1947 | Doesken | 425/311 |
| 2,614,290 | 10/1952 | Street | 425/311 |
| 2,862,243 | 12/1958 | Farr et al. | 264/142 |
| 3,025,564 | 3/1962 | Voigt | 264/142 |
| 3,177,820 | 4/1965 | Pazar et al. | 425/308 |
| 3,323,170 | 6/1967 | Swickard et al. | 425/310 |

*Primary Examiner*—W. E. Hoag
*Attorney, Agent, or Firm*—Holman & Stern

[57] ABSTRACT

This invention refers to a pelletizing and feeding-out device for fodder with varying degree of moisture, so called semi-moist fodder. The device can also take care of fish waste and other waste products, which can be used as fodder. The device comprises a rotatable container for the fodder, at the bottom of which a feeding-out device is arranged comprising a feeding chamber non-rotatably connected to the container and a feed screw extending through the feeding chamber and which does not take part in the rotation of the container and feeding chamber. The feed screw presses the fodder through a number of holes in the feeding chamber, at which the fodder is cut into suitable pellets or pieces. The container is further provided with at least one internal mixing arm constituting a support for the end of the feed screw located inside the container.

9 Claims, 4 Drawing Figures

DEVICE FOR PELLETIZING AND DOSED FEEDING-OUT OF FODDER WITH VARYING DEGREE OF MOISTURE

BACKGROUND OF THE INVENTION

The present invention relates to a device for pelletizing and dosed feeding-out of fodder with varying degree of moisture.

When feeding fish and certain farm animals, e.g. pigs, it is known that dry-feeding has obvious disadvantages. Thus, the conversion factor, that is the relation fodder weight/weight increase for fish is higher at dry-feeding than at the same quantity of fodder in a semi-moist condition. When dry-feeding pigs the animals may be subjected to diarrhea. Dry fodder is partly crumbled and these crumbs will, when the fish is fed, be spread on the water surface and thereby pollute the water. When feeding pigs and other farm animals the dry fodder will spread as dust, what has proved to be a health risk for the animals.

Moreover, the manufacture of dry fodder is energy demanding, as the components of the fodder, almost without exception, contain liquid which has to be removed before the dry fodder is ready for use.

Furthermore, when using dry fodder the breeder of fish or animals cannot use products from their own production to mix with the fodder. Examples of products, which cannot be used at dry-feeding are for instance waste products from fish-breeding and potatoes or the like from the farms.

To clear away the above-mentioned disadvantages so called semi-moist fodder has been developed, which despite a high degree of moisture has satisfactory keeping qualities. Into this semi-moist fodder you can mix products from your own production as well as medicine and vitamins or the like, which otherwise has to be given the animals separately.

One of the advantages with the dry fodder is that it is relatively easy to dose adequate quantities of fodder with fodder automatic machines, hereby making the feeding highly automatic.

With earlier devices used for dry fodder it is not possible to use semi-moist fodder.

When using waste products from fish, containing for example scales, in a semi-moist fodder the scales have a tendency to block up the openings of the feeding out device so that neither pelletizing nor feeding is achieved. Large-scale tests have been performed to overcome this problem but so far no device suitable for feeding-out a soft moist fodder mass containing scales or components like that has been constructed. This has been the reason why fish waste has not been used for this kind of fodder, what is a great disadvantage, as there is a large quantity of fish waste with a high nutritive value which is otherwise wasted. Scaling the fish before using it would be so costly that the fish waste are not longer of any interest as fodder.

SUMMARY OF THE INVENTION

The purpose of the present invention is to provide a device for pelletizing and dosed feeding-out of fodder of varying degree of moisture, semi-moist fodder. The invention provides a simple and reliable automatic feeding-out device. Another purpose of the invention is to obtain a feeding out device which can also manage to take care or waste products and which even if it would be stuffed up can easily be removed from the inside of the container without removing it from its support. This has been solved thereby, that the container is pivoted about its longitudinal axis and is coaxially and non-rotatably connected to the feeding chamber of the feeding out device, said chamber rotation-symmetrically supporting a feed screw, fixed against rotation, and that the container is provided with at least one internal mixing arm constructed to form a support for the inner end of the feed screw located inside the container.

DESCRIPTION OF SOME PREFERRED EMBODIMENTS

Figure 1:
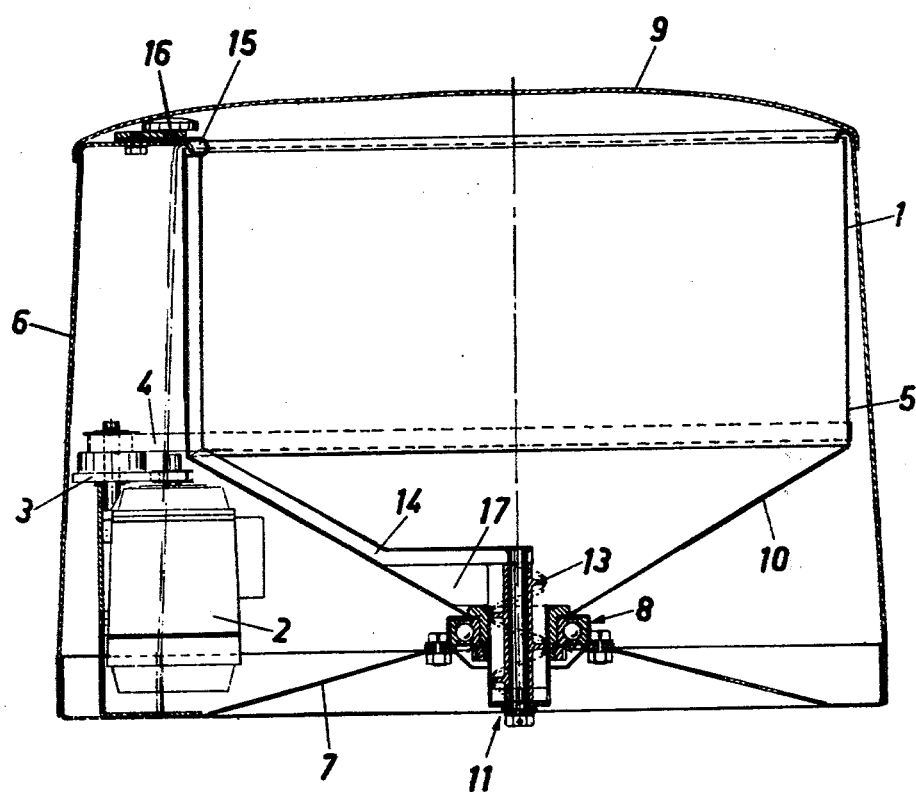
FIG. 1 is a section through the apparatus according to the invention.

FIG. 1 shows the device according to the invention without supporting devices, the design of which is depending on the field of application. In case the device is to be used for feeding fish it is fit to a fish basin (not shown) or to a raft. As appears from the FIGS. 1 and 2 the device comprises a container 1, arranged rotatable by means of an electric motor or the like, which via a gear mechanism 3 and a driving belt 4 transfers the rotation to a mainly cylindrical part 5 of the container 1. To protect the motor and the container these parts are arranged in a housing 6, the bottom 7 of which is designed as a carrier for the gearing 8 of the rotatable container 1. By means of a cover 9 the housing as well as the container are closable. The housing as well as the cover and possibly also the container can be heatinsulated.

In the inclined bottom 10 of the container 1 there is centrally arranged a feeding out device 11 comprising a feeding chamber 12 supported by the bearing 8, in which feeding chamber a nonrotatable feed screw 13 is arranged. This is in its upper part fixed to an arm 14 extending along the inside of the container and up towards the upper edge of the container, where the arm passes into a horisontal part 15, which by means of a coupling 16 can be fixed to the housing 6. The arm 14 is at the bottom provided with a wing 17 extending almost up the the feed screw 13.

Figure 2:
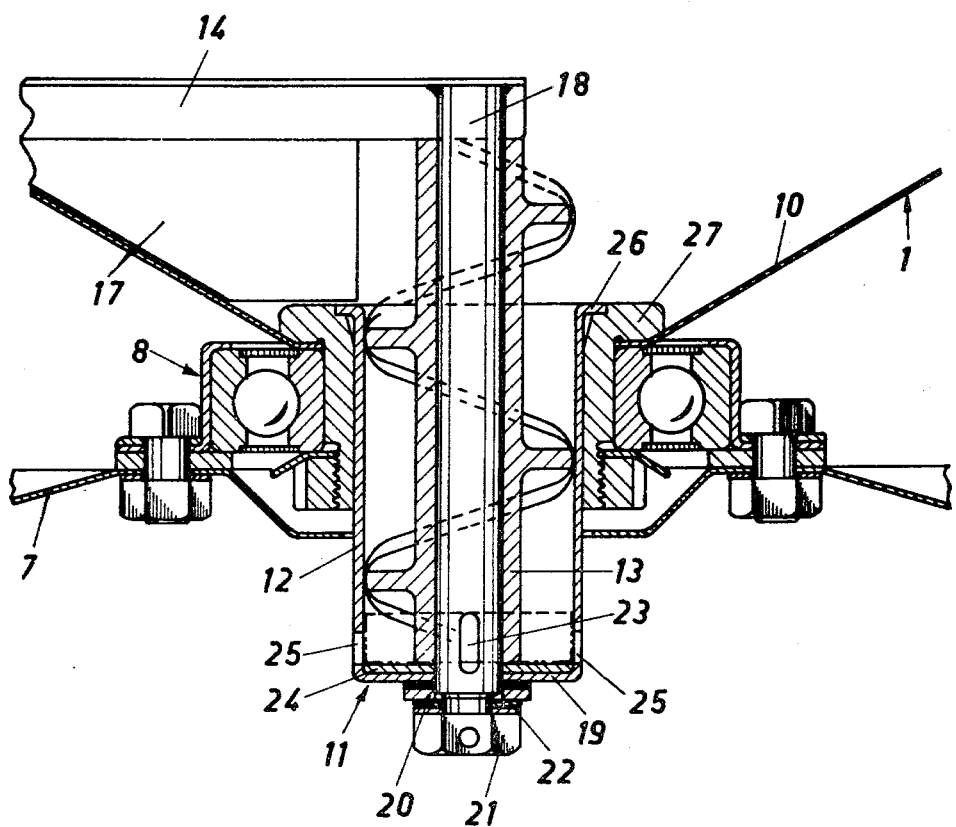
FIG. 2 is a large-scale section through the feeding out device of the apparatus.

In the embodiment illustrated in FIGS. 1 and 2, the feed screw 13 consists of a casing, which is supported on an axle 18 fixed to the arm 14. This axle 18 is longer than the feeding chamber and extends with its outer end, provided with a thread, through a hole 20 in the bottom 10 of the feeding chamber. By means of a nut 21 and one or more spring washers 22 a knife 23, extending radially through the feed screw 13 and the axle 18, can be tensioned to contact to the bottom 19 of the feeding chamber and resp. a wear washer 24 resting on this bottom. Opposite the knife 23 openings 25 are arranged in the envelope surface of the feeding chamber 12, through which openings 25 the fodder, in pace with the rotation of the container 1 relative to the feed screw, is fed in form of pellets. The feeding chamber 12 is in its upper end constructed with a radial flange 26 with a noncircular form, for example square, so that the feeding chamber is fixed against rotation in a bearing case 27 supported by the bearing 8. The device works in the following way:

The semi-moist fodder is filled into the container 1, which is rotated by the motor 2. As the feed screw 13 does not take part in this rotation the fodder will be fed in a direction towards the bottom of the feeding chamber, where the fixed knife 23, in pace with the rotation of the container, cuts the fodder strings, fed through the openings 25, into suitable pellets. As the knife 23 rests against the bottom of the feeding chamber and the wear washer 24, respectively, the bottom is continuously cleaned from possible fodder material like fish scales, bones or the like.

At the same time the knife 23 extends radially and almost up to the inside of the housing defining the feeding chamber, so that more solid fodder components are cut into pieces in interaction with the edges of the openings 25. If there should still be a stoppage in the feeding device, the motor is automatically stopped and at the next inspection the arm 14 together with the feed screw and the feeding chamber 12 can, by unscrewing the coupling 16 with a simple turn of the hands, be lifted up and out of the bearing casing 27 for control and cleaning, if needed, and the feeding device 11 will then be replaced in the bearing casing and the arm 14 will be fixed to the housing by means of the coupling 16.

The fixed arm also works as a mixer which may be constructed with further mixing members along the arm 14 similarly to the flange 17.

Depending on the age and growth of the fish they are to be fed with pellets of different sizes. This means that the openings 25 of the feeding out device must be easily adapted to these prior conditions and therefore the feeding chamber 12 should be easily changed to a feeding chamber with larger or smaller feeding openings 25. A series of opening sizes of 4,6,8 and 10 mms has proved to be suitable.

Figure 3:
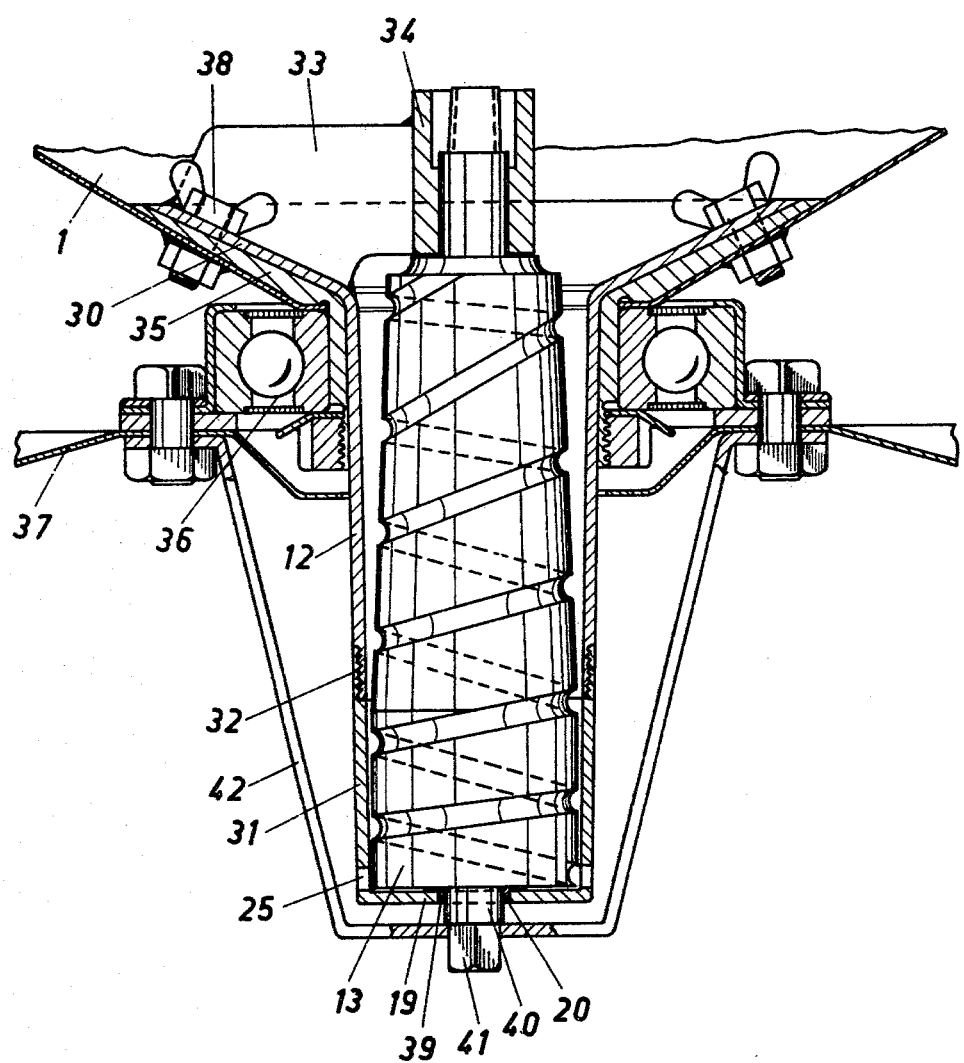
FIG. 3 is a section through an embodiment of the feeding device.

The feeding out device according to FIG. 3 comprises a feeding chamber 12, which at its upper end is provided with a ring-shaped connection flange 30 and at its bottom end with a screw-on section 31, which with threads 32 can be screwed on to the feeding chamber. At the connection flange 30 there are fixed radial webs 33, which support a central bearing 34 for a feed screw 13. The webs 33 are designed to work as mixing arms for the fodder. The container 1 is at its bottom opening provided with a supporting flange 35 resting on the bearing ring of a ball bearing 36, which is supported by a stand 37. By means of screws 38 the ring-shaped connection flange 30 of the feeding chamber 12 can be screwed on to the inside of the feeding chamber, and the container opening is designed large enough for the feeding chamber 12 together with the attached screw-on 31 to pass through this opening.

The feed screw 13 remote from the feeding-in end has a shoulder adjacent plane end plate 19 of the housing 12. In close connection to said end plate a number of holes 25 are made in the part of the screw-on section 31, and the inner openings of said holes, which face the feed screw, are located a small distance from the feed screw. In the end plate 19 of the screw-on section 31 a central hole 20 is arranged, in which there is a bearing 39 for a coaxial extension 40 fixed to the feed screw and provided with a part 41 with a non-circular section and extending outside the bearing. The part 41 is introduced into a corresponding recess in a loop 42 fixedly connected to the stand 37. By designing the feed screw 13 with an end part essentially corresponding to the inner space of the screw-on section and by arranging the feeding-out openings 25 radially close to the end plate 19 these parts work as a cutting device which effectively cuts into pieces very thin fish scales and the like.

It has proved to be particularly suitable to drive the container 1 with a pneumatic motor and to lead the compressed air, utilized by the motor, into the water in the area close to or opposite the fodder let-down. By this procedure two advantages are achieved, that is an oxygen supply of the water (the added air amounts to about 10-15 lit/sec.) and a distribution of fodder pellets on a larger surface by the rising air bubbles. To achieve these effects the outlet pipe of the pneumatic motor is led under the water, so that the mouth will be located about half a meter below the water surface and preferably vertically under the feeding device 11. If the fodder does not contain any fish waste and/or other components making the feeding difficult, the device according to FIG. 4, with or without a cutting device, may be of use.

The rotatable container 1 is provided with internal mixing arms 43 forming spokes to a hub 44, which via a slide bearing 45 is rotating about a tap to the feed screw 13 placed rotation-symmetrically in the feeding chamber 12, said feed screw being fixed against rotation. The feeding chamber 12 is provided with substantially axial grooves 46 and the feed screw 13 is provided with a circumferential helical groove 47. The feeding chamber 12 is by means of bolts 38 or the like attached to the container 1 and rotating about this. At the same time the feeding chamber is via a bearing 8 mounted round a fixed stand 37. At the end of the feed screw 13, remote form the container there is arranged a press arm 48 which like the feed screw 13 is fixed against rotation. Outside the press arm 48 there is a perforated disc 49 arranged to take part in the rotation of the container and the feeding chamber. As appears from the figure the perforated disc 49 is anchored to the chamber 12 by means of a locking ring 50 provided with flanges.

Figure 4:
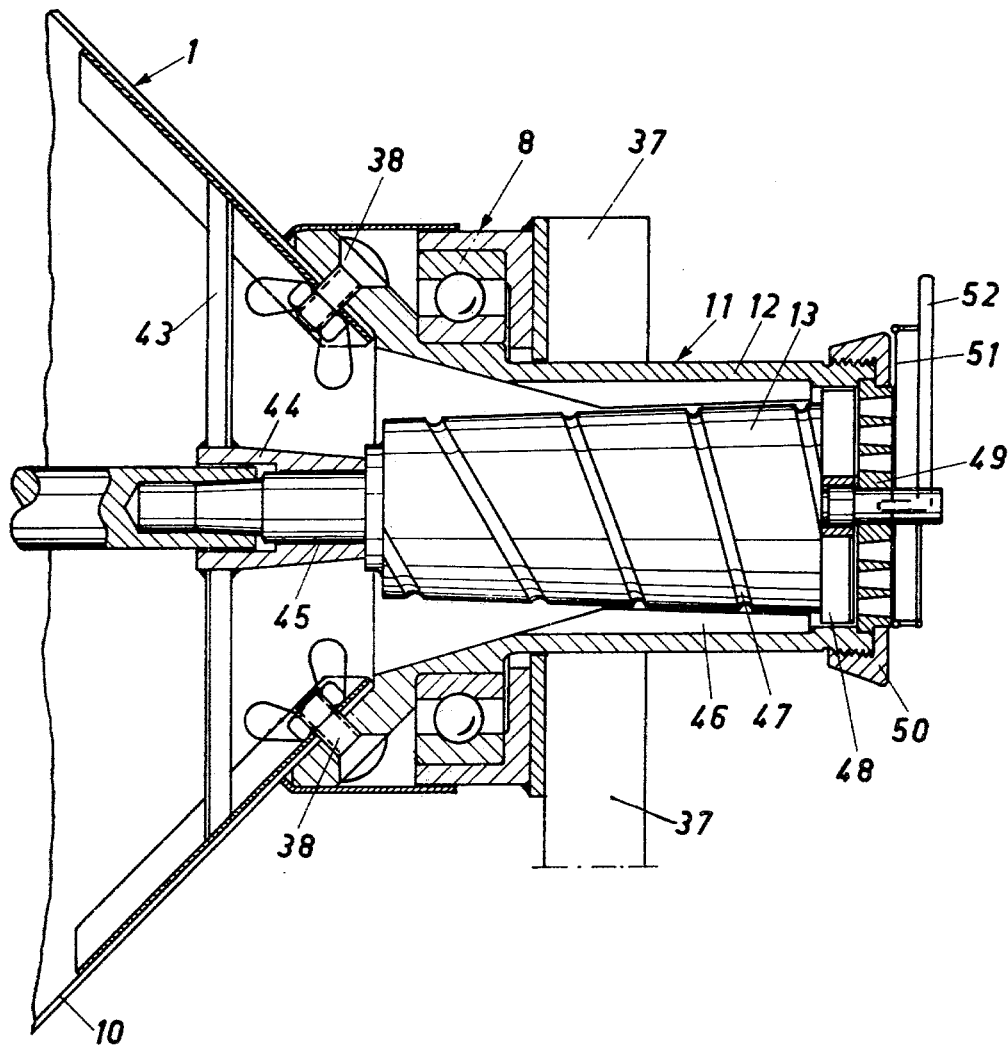
FIG. 4 is an axial section through a further embodiment of a part of the container and the feeding chamber.

The feeding out device 11 may be provided with a cutting device 51, which as illustrated in FIG. 4, may consist of a wire diametrically extended over the perforated disc and fixed to a firm support 52 preventing said wire from taking part in the rotation of the perforated disc. The holes in the perforated disc might be conical so that the diameter of the holes increases in direction from the feeding chamber. This provides a clearance effect resulting in the fact that the pellets do not fasten to the perforated disc but fall off.

The function of the device according to FIG. 4 is such that the components of the fodder in the container will continuously be mixed during the rotation of the container and at the same time fall down towards the feeding chamber 12. By friction and pressure the fodder will here be led between the grooves 46 of the feeding chamber and the feed screw 13 and the press arm 48 or the cutting device 51 respectively and through the rotating perforated disc 49. The fodder which has an easily formable consistency will form strings which momentarily are cut into pieces—pellets—by the immobile cutting device 51, whereupon the fodder pieces can fall freely from the device at every occasion when the driving motor of the container is connected by means of a time relay included in the steering unit. These pellets may be allowed to fall on a thin water film, which is sprayed over the water surface, and consequently said pellets are spred over a larger surface of the fish feeding place. By this construction an exact dosage could be performed by adequate adjustment of the time relay, and with this the advantages of th semi-moist fodder can be utilized together with the advantages of automtic feeding.

The invention is not limited to the embodiments illustrated in the drawings and described in connection to these, but modifications are possible within the scope of the following claims.

What I claim is:

1. A device of the pelletizing fodder, comprising: a container and screw housing attached thereto, both said container and said housing being supported for rotation together about a vertical axis and about a fixed screw member, said screw member being adapted to feed fodder from said container to a perforated extrusion die, and fixed cutter means cooperatively associated with said die to cut said fodder into pellets.

2. The claims of claim 1 wherein said die member is a radially perforated portion of said housing adjacent an end of said screw remote from said container.

3. The apparatus of claim 2 wherein said cutting means is a knife secured to said screw member inside of said housing and is pressed against an end surface of said housing by a spring.

4. A device according to claim 2 or 3, wherein said housing is removably attached to said container and together with said screw is displaceable into the container.

5. A device according to claim 2, wherein the end of said housing is threadedly attached to said housing and carries a bearing for said screw member, said screw member extending through said bearing and being fixed to a support for said device, said end also having perforations and serving as said die.

6. A device according to claim 5, wherein at an end of said screw nearest said container a bearing for said screw is disposed and said housing adjacent said container has a flange for connection inside of said container, with said housing extending through a bottom opening of said container.

7. A device according to claim 6 or 8 wherein said cutting means is fixed and extends diametrically over an external surface of said disc and is adapted to cut pellets from fodder strings formed by said screw, a press arm attached thereto and said die.

8. A device according to claim 1 wherein an inner surface of said housing is grooved, and said die is a rotatable disc forming an end of said housing below said screw.

9. A device according to claim 8, wherein the perforated disc is designed with conical holes expanding in direction from the container.

* * * * *